(12) United States Patent
Futatsugi et al.

(10) Patent No.: US 10,040,535 B2
(45) Date of Patent: Aug. 7, 2018

(54) COMPOSITE ACCOUSTICAL PANELS ESPECIALLY USEFUL FOR INTERIOR PANEL ASSEMBLIES OF AIRCRAFT PASSENGER CABINS

(71) Applicant: EMBRAER S.A., São José dos Campos - SP (BR)

(72) Inventors: Sideto Futatsugi, São José dos Campos (BR); Israel Pereira, São José dos Campos (BR); Danillo Cafaldo Dos Reis, São José dos Campos (BR)

(73) Assignee: EMBRAER S.A., São José dos Campos - SP (BR)

( * ) Notice: Subject to any disclaimer, the term of this patent is extended or adjusted under 35 U.S.C. 154(b) by 313 days.

(21) Appl. No.: 14/957,185

(22) Filed: Dec. 2, 2015

(65) Prior Publication Data

US 2017/0158307 A1    Jun. 8, 2017

(51) Int. Cl.
| | |
|---|---|
| *B32B 3/12* | (2006.01) |
| *B64C 1/40* | (2006.01) |
| *G10K 11/172* | (2006.01) |
| *B64C 1/00* | (2006.01) |

(52) U.S. Cl.
CPC ............ *B64C 1/40* (2013.01); *G10K 11/172* (2013.01); *B64C 2001/0072* (2013.01)

(58) Field of Classification Search
CPC ....... E04B 2001/748; B32B 3/12; B64C 1/40; B64C 2001/0072; G10K 11/172
USPC ...................................................... 181/292
See application file for complete search history.

(56) References Cited

U.S. PATENT DOCUMENTS

| | | | | |
|---|---|---|---|---|
| 4,416,349 A * | 11/1983 | Jacobs | ........... | G10K 11/16 181/208 |
| 4,667,768 A * | 5/1987 | Wirt | ........... | G10K 11/172 181/286 |
| 7,743,884 B2 * | 6/2010 | Thomas | ........... | B64C 1/40 181/292 |
| 7,938,224 B2 * | 5/2011 | Frustie | ........... | B64D 33/02 181/213 |
| 8,087,494 B2 | 1/2012 | Palumbo et al. | | |
| 8,327,976 B2 * | 12/2012 | Muller | ........... | B64C 1/40 181/210 |

(Continued)

*Primary Examiner* — Jeremy Luks
(74) *Attorney, Agent, or Firm* — Nixon & Vanderhye P.C.

(57) ABSTRACT

Composite acoustic panels are provided which may usefully be employed for aircraft interior panel assemblies. The composite acoustic panels may include a core member defining opposed surfaces, and a pair of exterior face sheets each attached to a respective one of the opposed surfaces of the core member. At least one of the face sheets may be microperforated. The core member comprises an adjacent plurality of tubular channels extending through a thickness dimension of the core member between the opposed surfaces thereof, while predetermined adjacent ones of the tubular channels are filled with a material to define a series of filled tubular channels which are adjacent to a region of open tubular channels. Certain ones of the open tubular channels may be partially filled with an acoustic dampening material. Discontinuous viscoelastic layers may be positioned so as to overlay central regions of the adjacent plurality of the open tubular channels which are bounded by an array of the filled tubular channels.

27 Claims, 5 Drawing Sheets

(56) References Cited

U.S. PATENT DOCUMENTS

| | | | |
|---|---|---|---|
| 8,657,067 B1* | 2/2014 | Mathur | B32B 5/24 |
| | | | 181/284 |
| 2010/0148001 A1 | 6/2010 | Hoetzeldt et al. | |
| 2011/0186380 A1* | 8/2011 | Beauvilain | B60R 13/08 |
| | | | 181/292 |
| 2013/0292202 A1* | 11/2013 | Moutier | B29C 73/04 |
| | | | 181/292 |
| 2014/0133964 A1* | 5/2014 | Ayle | G10K 11/172 |
| | | | 415/119 |
| 2014/0299409 A1 | 10/2014 | Mathur et al. | |
| 2017/0011728 A1* | 1/2017 | Simon | B64C 1/40 |

* cited by examiner

FIG. 4

COMPOSITE ACCOUSTICAL PANELS ESPECIALLY USEFUL FOR INTERIOR PANEL ASSEMBLIES OF AIRCRAFT PASSENGER CABINS

FIELD

The embodiments disclosed herein relate generally to composite acoustic panels that may be employed usefully as part of an interior aircraft cabin panel assembly.

BACKGROUND

The cabin noise level in a transport category aircraft is typically a combination of several energy sources such as engine noise, engine vibration, turbulent boundary layer, air-conditioning machinery noise, and the like. The noise sources enter the aircraft cabin through different paths, the two major paths being an air-borne path and a structural-borne path. The interior trim panels of an aircraft cabin have a relatively large surface area and are usually fabricated from lightweight materials having low noise damping properties. These three characteristics in a single structural element, namely lightweight, low damping material and large surface area, therefore cause the interior trim panels to play an important role in the structure-borne path, and consequently in the aircraft cabin noise levels that are experienced. One of the most common noise control techniques used in current interior aircraft cabin design is to physically attach pieces of viscoelastic material onto the back of the interior trim panel in order to impose some noise damping properties on the panel.

Various proposals exist in the art to enhance the vibro-acoustic properties of aircraft interior trim panels, such as those described in US Published Application No. 2010/148001, US Published Application No. 2014/0299409 and U.S. Pat. No. 8,087,494, the entire contents of each being expressly incorporated hereinto by reference. One principal disadvantage of such prior proposals, however, is that the mechanical properties of the panels are jeopardized due to discontinuities in the junction of the core and cover layers.

What has been needed in the art, therefore, are aircraft interior cabin panels that exhibit improved acoustic damping and mechanical properties. It is towards fulfilling such needs that the embodiments disclosure herein are directed.

SUMMARY

The embodiments disclosed herein are directed toward composite acoustic panels which include a core member defining opposed surfaces, and a pair of exterior face sheets each attached to a respective one of the opposed surfaces of the core member. The core member comprises an adjacent plurality of tubular channels extending through a thickness dimension of the core member between the opposed surfaces thereof, while predetermined adjacent ones of the tubular channels are filled with a material to define a series of filled tubular channels which are adjacent to a region of open tubular channels.

According to certain embodiments, the filled tubular channels of the composite acoustic panel may define a plurality of substantially elongate arrays, which may be linear or non-linear. In certain embodiments, linear arrays of the filled tubular channels are provided to form a geometric lattice of intersecting linear arrays of the filled tubular channels which bound respective central regions of the open tubular channels. Such bound central regions of the open tubular channels may be diamond-shaped.

A plurality of discontinuous viscoelastic layers may be attached to one of the face sheets. In those embodiments whereby the filled tubular channels define a geometric lattice of intersecting linear arrays which bound respective central regions of an adjacent plurality of the open tubular channels, the discontinuous viscoelastic layers may be positioned so as to overlay the central regions of the adjacent plurality of the open tubular channels. Thus, in certain embodiments both the central regions of the adjacent plurality of the open tubular channels and the discontinuous viscoelastic layers are diamond-shaped.

According to other embodiments, at least one of the face sheets may be perforated, e.g., microperforated. In certain embodiments, predetermined ones of the open tubular channels are partially filled (e.g. up to about 60 vol. %, for example between about 25 vol. % to about 60 vol. %) with an acoustic dampening material. In such embodiments, the acoustic dampening material will thus close (cover) one end of the open tubular channels and be physically adhered to the face sheet at that end so the opposite end thereof remains open (but is covered by the face sheet attached to the surface of the core member such that an air space is present in the channels).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
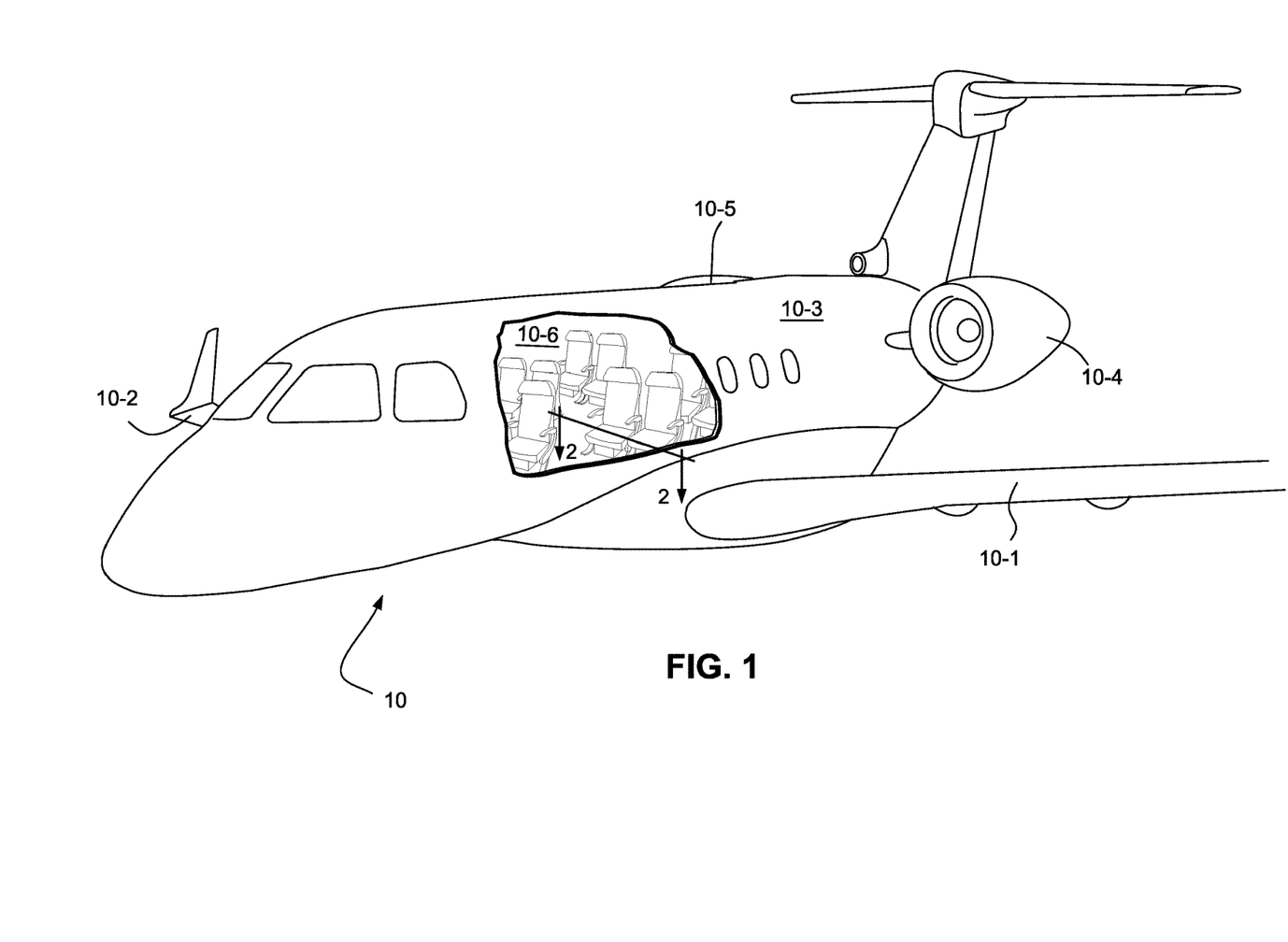
FIG. 1 is a front perspective view showing an exemplary aircraft which is partially sectioned at the fuselage thereof that may include an interior composite acoustical panel assembly in accordance with an embodiment as disclosed herein.

Accompanying FIG. 1 depicts an aircraft 10 in which embodiments of the composite acoustic panels as disclosed herein may be implemented. In this regard, the aircraft 10 includes wings 10-1, 10-2 attached to and extending laterally from the elongate fuselage 10-3. Engines 10-4, 10-5 for the depicted aircraft 10 are attached to an aft region of the fuselage 10-3 but could similarly be attached under each wing 10-1, 10-2. It is of course to be understood that the aircraft 10 is exemplary only as the embodiments of the composite acoustic panels to be discussed hereinbelow may likewise be suitably employed with propeller driven aircraft or even single engine aircraft.

Figure 2:
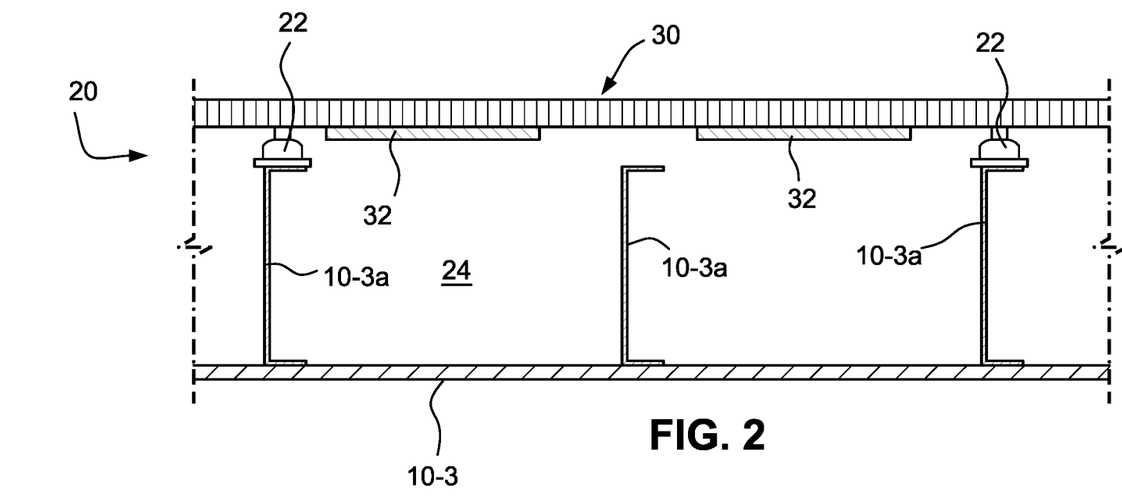
FIG. 2 is an enlarged cross-sectional view of the aircraft fuselage which includes an interior panel assembly having an interior composite acoustical panel according to an embodiment as disclosed herein as taken along line 2-2 in FIG. 1.

As depicted in the exposed portion of FIG. 1, the aircraft 10 has an interior cabin 10-6 that may include an interior panel assembly 20 as is depicted in greater detail in FIG. 2. As shown, the interior panel assembly 20 includes a composite acoustical panel 30 connected to an interior portion of the frame members 10-3a of the fuselage 10-3 by mounting members 22. A skin of the fuselage 10-3 may be formed of e.g., aluminum sheets or cured fiber-reinforced composite sheets, and may be attached to the exterior portion of the frame members 10-3a. A plurality of discontinuous viscoelastic layers 32 may optionally be attached adhesively to the back side of the panel 30 (i.e., so as to be positioned in the space 24 between the panel 30 and the fuselage 10-3).

Figure 3:
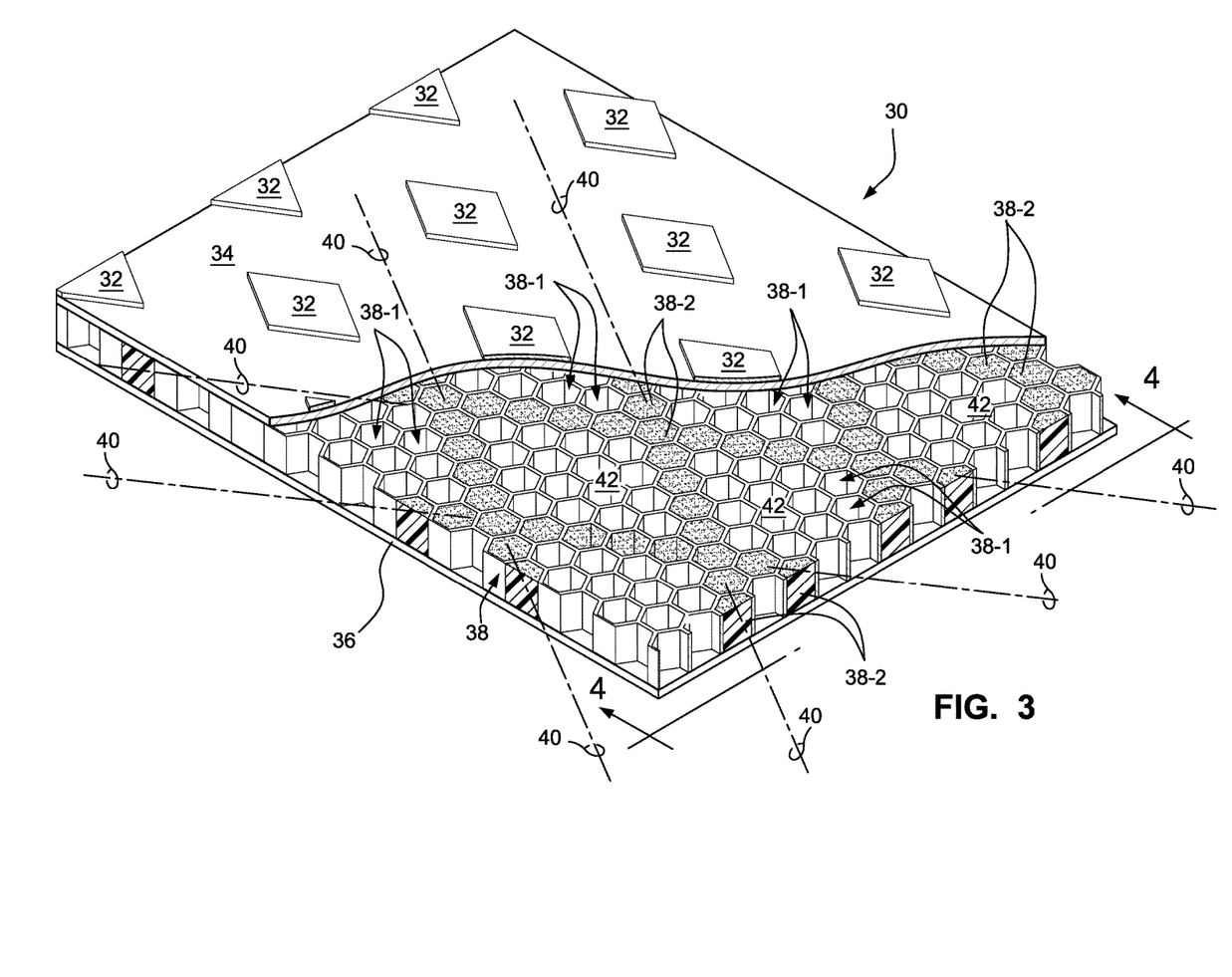
FIG. 3 is a top perspective view of the composite acoustical panel depicted in FIG. 2 showing a region of the back face sheet removed for clarity of presentation so as to reveal the inner core member thereof.
Figure 4:
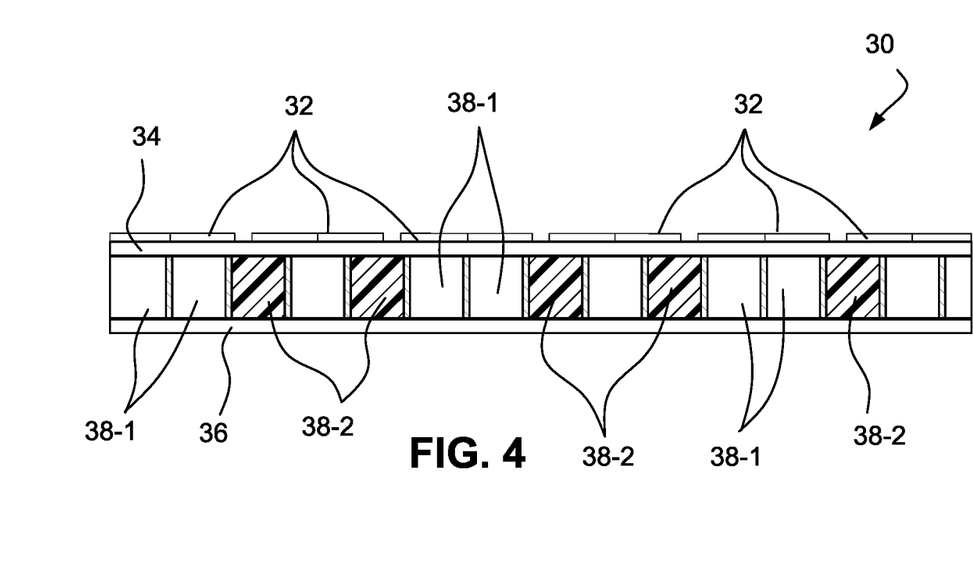
FIG. 4 is an end elevational view of the composite acoustical panel depicted in FIG. 3 as taken along line 4-4 thereof.

Accompanying FIGS. 3 and 4 show one embodiment of the composite acoustical panel 30 that may be employed in the interior panel assembly 20. Specifically, the acoustical panel 30 shown in FIGS. 3 and 4 includes a pair of opposed exterior face sheets 34, 36 with a core member 38 interposed therebetween. As shown, the face sheet 34 represents a back side of the panel 30 while the face sheet 36 represents a front side of the panel 30 in relation to the interior cabin 10-6. That is, the face sheet 34 faces the fuselage 10-3 and defines therebetween the space 24, while the face sheet 36 faces the interior of the cabin 10-6. A portion of the face sheet 34 has been removed in the depiction of FIG. 3 for ease of explanation and understanding, it being understood that the face sheets 34 and 36 will completely cover the entire surface area of the core member 38. The exterior face sheets 34, 36 are moreover physically attached to a respective surface of the core member 38 by a suitable bonding agent (e.g., a resin adhesive, such as an epoxy) so as to be bonded thereto.

The core member 38 preferably has open (unfilled) channels extending transversely throughout the entire thickness dimension thereof (i.e., from one surface of the core member 38 to the opposite surface thereof). The open channels may be tubular forms of virtually any cross-sectional geometry, e.g., circular, oval, multifaceted or the like. In the embodiment depicted, the core member 38 includes a plurality of adjacent multi-faceted hexagonal cross-sectional open tubular channels (i.e., a so-called "honeycomb" structure), a few of which are identified in FIGS. 3 and 4 by reference numeral 38-1.

A series of adjacent open channels 38-1 of the core member 38 are filled with a light weight, high stiffness reinforcement material, to form filled channels, a representative few of which are identified by reference numeral 38-2 in FIGS. 3 and 4. The series of filled channels 38-2 will typically form a plurality of elongate arrays which may be linear or non-linear. In the embodiment depicted, the series of filled channels 38-2 form a geometric lattice of intersecting linear arrays 40 which thereby bound respective central regions 42 of unfilled adjacent open channels 38-1 forming a general diamond-shaped pattern. The filled channels 38-2 need not however be in such a depicted pattern, but instead could be provided as plural intersecting or non-intersecting linear and/or non-linear filled adjacent channels and/or any other geometric pattern that may be suited for the particular tubular channels associated with the core member 38.

The presence and geometry of the filled channels 38-2 subdivides the core member 38 by segregating the bounded regions 42 of unfilled channels 38-1 thereby advantageously decreasing the noise radiation efficiency of the overall panel 32 in the low frequency range. In order to reduce noise in the relatively high frequency range, the discontinuous viscoelastic layers 32 are positioned on the back face sheet 34 so as to overlay (i.e., be superjacent to) the bounded central regions 42 of the unfilled adjacent open channels 38-1. The viscoelastic layers 32 may thus be formed of a substantially complementary geometry to the geometry of the central regions 42. For example, in the embodiment depicted in FIGS. 3 and 4, both the bounded central regions 42 of the open channels 38-1 and the viscoelastic layers 32 are in a substantially diamond-shaped configuration. It will be understood, however that such a diamond-shaped geometry is exemplary only and virtually any geometry may be employed in the practice of the invention as described herein by way of certain specific embodiments.

Any suitable viscoelastic material may be employed as the layers 32 in the embodiments disclosed herein. In this regard, the term "viscoelastic material" is meant to refer to any material which exhibits both elastic and viscous deformation under a deformation load. Suitable viscoelastic materials that may be employed as the layers 32 are available from several commercial sources, e.g., SMACSONIC® composites which include SMACTANE® viscoelastic layer commercially available from SMAC Groupe of Lagarde, France; ISODAMP® SD viscoelastic damping materials commercially available from E-A-R Aearo Technologies, a 3M company of Indianapolis, Ind., USA; DELTANE® damping materials commercially available from Hutchinson Aerospace of Burbank, Calif., USA; STAND-OFF DAMPING SYSTEMS™ commercially available from Damping Technologies, Inc. of Mishawaka, Ind., USA.

The open channel core member 38 may be formed of any suitable material, e.g., plastic or metal (e.g., aluminum or other lightweight metal alloys). In preferred forms, the core member 38 may be a honeycomb structure formed of a plastics material (e.g., polyamides, polyalkalenes, polyesters, polyaramids and the like).

The face sheets 34, 36 may also be formed of a suitable material to be bonded to the core member 38, including by way of example, fabrics (e.g., woven and/or nonwoven synthetic fibers), polymeric films that may or may not be reinforced with, e.g., glass, carbon and/or graphite fibers. The reinforcement material forming the filled channels 38-2 of the core member 38 must of course be selected so as to be compatible with the material(s) of the face sheets 34, 36 as well as the material(s) forming the core member 38. Preferably, the reinforcement material forming the filled channels 38-2 is such that the face sheets 34, 36 are adhered thereto. Particularly preferred reinforcement materials are those that exhibit a relatively high stiffness and low weight. Such reinforcement materials may include, for example, include epoxy-based adhesives.

Figure 5:
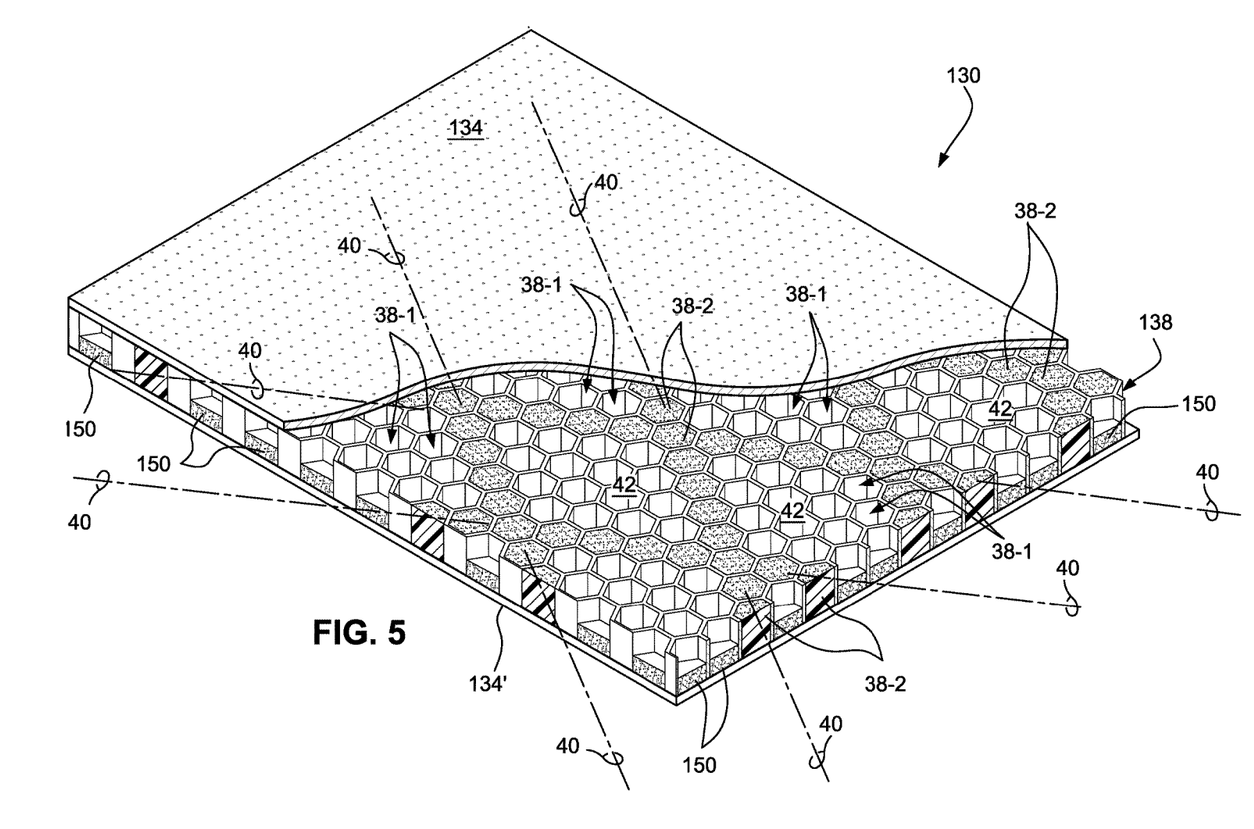
FIG. 5 is top perspective view of another embodiment of a composite acoustical panel as disclosed herein.

Another embodiment of a composite acoustical panel 130 is depicted in accompanying FIG. 5. In this regard, the acoustical panel 130 is generally similar to the acoustical panel 30 as described previously in that a core member 138 is provided which includes a linear series 40 of filled channels 38-2 in a lattice geometry bounding corresponding central regions 42 of open channels 38-1 of the honeycomb core 38. However, unlike the acoustical panel 30 as previously described, the acoustical panel 130 depicted in FIG. 5 is provided with a microperforated face sheet 134 over a surface of the core member 138. In this regard, the microperforated face sheet 134 is most preferably on the back side of the panel 130, but could also be provided on the front side thereof if desired as noted by reference numeral 134'.

The microperforated face sheet 134 (and 134' if employed) assists in improving the absorption characteristics of the panel 130 and reduction of the radiation efficiency thereof at the high frequency range of noise. The face sheet 134 (134') may be formed of any suitable light weight material, e.g., a carbon or other synthetic fiber sheet impregnated with an epoxy or phenolic resin. The size and arrangement of the microperforations in the face sheet 134 (134') will depend on the frequency that is desired to be damped thereby. By way of example, the microperforation diameters (which may be the same or different) can range between 0.1 and 3 mm, preferably between 0.1 and 0.6 mm and be arranged such that there are between about 1 to about 10, preferably between about 1 to about 3 microperforations per cell of the open channel core member 38.

In addition to the presence of the microperforated face sheet 134 (134'), the acoustical panel 130 also includes a material 150 that provides acoustic dampening or absorption partially filling at least some, and typically all, open channels 38-1. Thus the term "acoustic damping material" will mean any material that will dampen acoustic waves by whatever means, including acoustic wave absorption. These open channels 38-1 partially filled with the acoustic dampening material 150 may however alternatively be employed with a non-perforated face sheet 34 as depicted in FIG. 3. If present, the acoustic dampening material may fill up to about 60%, e.g., between about 25-50% of the volume of the open channels 38-1, so that one end of such channels 38-1 is closed by the material 150 with the opposite end of the channels 38-1 remaining open. The acoustic dampening material 150 may thus be adhered to the face sheet 36. Any suitable acoustic dampening material 150 may be employed, such as open and closed cellular polymeric foam materials, glass wool, synthetic or natural fibrous batting material and the like. An open celled polymer foam material is presently preferred.

Various modifications within the skill of those in the art may be envisioned. For example, while only a single linear array of filled cells are depicted, it may be desirable to fill multiple mutually adjacent linear arrays of such cells. In addition, as noted previously, the embodiments disclosed herein envision a diamond-shape geometric regions of unfilled cells when the linear arrays of filled cells form a lattice-type arrangement. Any other geometric arrangement is however contemplated.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A composite acoustic panel comprising:
a honeycomb core member defining opposed surfaces, and
a pair of exterior face sheets each attached to a respective one of the opposed surfaces of the core member, wherein
the core member comprises an adjacent plurality of multi-faceted hexagonal cross-sectional tubular channels extending through a thickness dimension of the core member between the opposed surfaces thereof; and wherein
predetermined adjacent ones of the tubular channels are filled with an acoustic dampening material to establish a series of filled tubular channels which are adjacent to a region of open tubular channels, wherein
the filled tubular channels define a geometric lattice of intersecting elongate linear arrays of adjacent filled tubular channels, wherein
the linear arrays of adjacent filled tubular channels bound respective central regions of an adjacent plurality of the open tubular channels such that the central regions of the open tubular channels are separated from one another by the linear arrays of adjacent filled tubular channels, and wherein
each of the filled tubular channels in a respective one of the linear arrays thereof is adjacent to a pair of adjacent filled tubular channels in the respective linear array thereof and a pair of adjacent unfilled tubular channels in respective ones of the bound central regions thereof.

2. The composite acoustic panel according to claim 1, wherein the bound respective central regions of the open tubular channels are diamond-shaped.

3. The composite acoustic panel according to claim 1, further comprising a plurality of discontinuous viscoelastic layers attached to one of the face sheets.

4. The composite acoustic panel according to claim 3, wherein the discontinuous viscoelastic layers overlay the central regions of the adjacent plurality of the open tubular channels.

5. The composite acoustic panel according to claim 4, wherein the central regions of the adjacent plurality of the open tubular channels and the discontinuous viscoelastic layers are diamond-shaped.

6. The composite acoustic panel according to claim 1, wherein at least one of the face sheets is perforated.

7. The composite acoustic panel according to claim 1, wherein predetermined ones of the open tubular channels are partially filled with an acoustic dampening material.

8. The composite acoustic panel according to claim 7, wherein the predetermined ones of the open tubular channels are filled to at most 60 vol. % with the acoustic dampening immaterial.

9. The composite acoustic panel according to claim 7, wherein the predetermined ones of the open tubular channels are filled with the acoustic dampening material so as to close one end of the open tubular channels.

10. The composite acoustic panel according to claim 7, wherein at least one of the face sheets is perforated.

11. The composite acoustic panel according to claim 7, further comprising a plurality of discontinuous viscoelastic layers attached to one of the face sheets.

12. The composite acoustic panel according to claim 11, wherein the discontinuous viscoelastic layers overlay the central regions of the adjacent plurality of the open tubular channels.

13. The composite acoustic panel according to claim 7, wherein the adjacent plurality of the open tubular channels in the central regions thereof are partially filled with the acoustic dampening material.

14. An aircraft which comprises a fuselage defining an interior cabin space having at least one interior panel assembly, wherein the interior panel assembly comprises a composite acoustic panel according to claim 1.

15. The aircraft according to claim 14, wherein the fuselage comprises frame members and a fuselage skin attached to an exterior of the frame members, and wherein the at least one interior panel assembly is attached to an interior of the frame members.

16. The composite acoustic panel according to claim 1, wherein the bound respective central regions of the open tubular channels are diamond-shaped.

17. The aircraft according to claim 14, further comprising a plurality of discontinuous viscoelastic layers attached to one of the face sheets.

18. The aircraft according to claim 17, wherein the discontinuous viscoelastic layers overlay the central regions of the adjacent plurality of the open tubular channels.

19. The aircraft according to claim 18, wherein the central regions of the adjacent plurality of the open tubular channels and the discontinuous viscoelastic layers are diamond-shaped.

20. The aircraft according to claim 14, wherein one of the face sheets is perforated.

21. The aircraft according to claim 14, wherein predetermined ones of the open tubular channels are partially filled with an acoustic dampening material.

22. The aircraft according to claim 21, wherein the predetermined ones of the open tubular channels are filled to at most 60 vol. % with the acoustic dampening material.

23. The aircraft according to claim 21, wherein the predetermined ones of the open tubular channels are filled with the acoustic dampening material so as to close one end of the open tubular channels.

24. The aircraft panel according to claim 21, wherein one of the face sheets is perforated.

25. The aircraft panel according to claim 21, further comprising a plurality of discontinuous viscoelastic layers attached to one of the face sheets.

26. The aircraft according to claim 25, wherein the discontinuous viscoelastic layers overlay the central regions of the adjacent plurality of the open tubular channels.

27. The aircraft according to claim 14, wherein the adjacent plurality of the open tubular channels in the central regions thereof are partially filled with an acoustic dampening material.

* * * * *